(12) United States Patent
Giaretta et al.

(10) Patent No.: US 7,808,986 B2
(45) Date of Patent: Oct. 5, 2010

(54) ROUTING METHOD, SYSTEM, CORRESPONDING NETWORK AND COMPUTER PROGRAM PRODUCT

(75) Inventors: Gerardo Giaretta, Turin (IT); Ivano Guardini, Turin (IT)

(73) Assignee: Telecom Italia S.p.A., Milan (IT)

( * ) Notice: Subject to any disclaimer, the term of this patent is extended or adjusted under 35 U.S.C. 154(b) by 706 days.

(21) Appl. No.: 11/578,069

(22) PCT Filed: Apr. 19, 2004

(86) PCT No.: PCT/IB2004/001165
§ 371 (c)(1),
(2), (4) Date: Oct. 12, 2006

(87) PCT Pub. No.: WO2005/101788
PCT Pub. Date: Oct. 27, 2005

(65) Prior Publication Data
US 2007/0230459 A1    Oct. 4, 2007

(51) Int. Cl.
*H04L 12/28* (2006.01)
(52) U.S. Cl. .................................... 370/389; 709/238
(58) Field of Classification Search ............ 370/337, 370/389; 455/3, 432, 517, 422, 452
See application file for complete search history.

(56) References Cited

U.S. PATENT DOCUMENTS

| | | | | |
|---|---|---|---|---|
| 5,506,904 A | * | 4/1996 | Sheldrick et al. | 380/212 |
| 5,881,061 A | * | 3/1999 | Iizuka et al. | 370/337 |
| 5,940,771 A | * | 8/1999 | Gollnick et al. | 455/517 |
| 6,021,413 A | * | 2/2000 | Vaduvur et al. | 707/201 |
| 6,741,856 B2 | * | 5/2004 | McKenna et al. | 455/422.1 |
| 6,792,536 B1 | * | 9/2004 | Teppler | 713/178 |
| 6,910,074 B1 | * | 6/2005 | Amin et al. | 709/227 |
| 6,915,345 B1 | * | 7/2005 | Tummala et al. | 709/225 |

(Continued)

FOREIGN PATENT DOCUMENTS

EP    1 161 032 (A2)    12/2001

(Continued)

OTHER PUBLICATIONS

Chen, et al., Problem Statement for MIPv6 Interactions with GPRS/UMTS Packet Filtering; Internet Draft; draft-chen-mip6-gprs-00.txt, IETF Internet Draft, XP002284133, pp. 1-17, (Feb. 5, 2004).

(Continued)

*Primary Examiner*—Thong H Vu
(74) *Attorney, Agent, or Firm*—Finnegan, Henderson, Farabow, Garrett & Dunner, L.L.P.

(57) ABSTRACT

A system for controlling the routing of the traffic relating to a mobile node associated with a provider's network, the mobile node being capable of communicating with at least one correspondent node associated with an additional network. For the mobile node and the correspondent node, there is the possibility of communicating in at least a first operation mode through the provider's network and in a second operation mode by an at least partial exclusion of the provider's network. The system includes at least one element associated with the provider's network typically formed by a server acting as a home agent and configured to selectively check the authorization of said mobile node to operate in the second operation mode.

26 Claims, 4 Drawing Sheets

U.S. PATENT DOCUMENTS

| | | | |
|---|---|---|---|
| 6,986,021 B2 * | 1/2006 | Master et al. ................. | 712/15 |
| 6,987,771 B2 | 1/2006 | Shimizu et al. | |
| 6,992,995 B2 * | 1/2006 | Agrawal et al. ............. | 370/328 |
| 7,130,905 B2 * | 10/2006 | Dinker et al. ............... | 709/225 |
| 2001/0053694 A1 | 12/2001 | Igarashi et al. | |
| 2003/0050070 A1 * | 3/2003 | Mashinsky et al. .......... | 455/452 |
| 2003/0093553 A1 | 5/2003 | Le et al. | |
| 2004/0157600 A1 * | 8/2004 | Stumpert et al. ......... | 455/432.1 |
| 2004/0223491 A1 * | 11/2004 | Levy-Abegnoli et al. .... | 370/389 |
| 2004/0236937 A1 * | 11/2004 | Perkins et al. .............. | 713/150 |
| 2006/0014490 A1 * | 1/2006 | Kopra et al. ................ | 455/3.05 |
| 2008/0061967 A1 * | 3/2008 | Corrado ................. | 340/539.26 |

FOREIGN PATENT DOCUMENTS

| | | |
|---|---|---|
| JP | 2001-339438 | 12/2001 |
| JP | 2002-176446 | 6/2002 |

OTHER PUBLICATIONS

Sudanthi, "Mobile IPv6", Information Security Reading Room, XP002282181, pp. 1-14, (Jan. 2003).

Johnson, et al., "Mobility Support in IPv6, draft-ietf-mobileip-ipv6-24.txt", ITEF Mobile IP Working Group, pp. 1-172, (Jun. 30, 2003).

Thomson, et al., "IPv6 Stateless Address Autoconfiguration", Network Working Group, ref. rfc2462, pp. 1-25, (Dec. 1998).

Arkko, et al., "Using IPsec to Protect Mobile IPv6 Signaling between Mobile Nodes and Home Agents, draft-ietf-mobileip-mipv6-ha-ipsec-04.txt", Network Working Group, pp. 1-48, (Mar. 20, 2003).

Perkins, "IP Mobility Support for IPv4", Network Working Group, rif. rfc3344, pp. 1-99, (Aug. 2002).

* cited by examiner

Fig_1
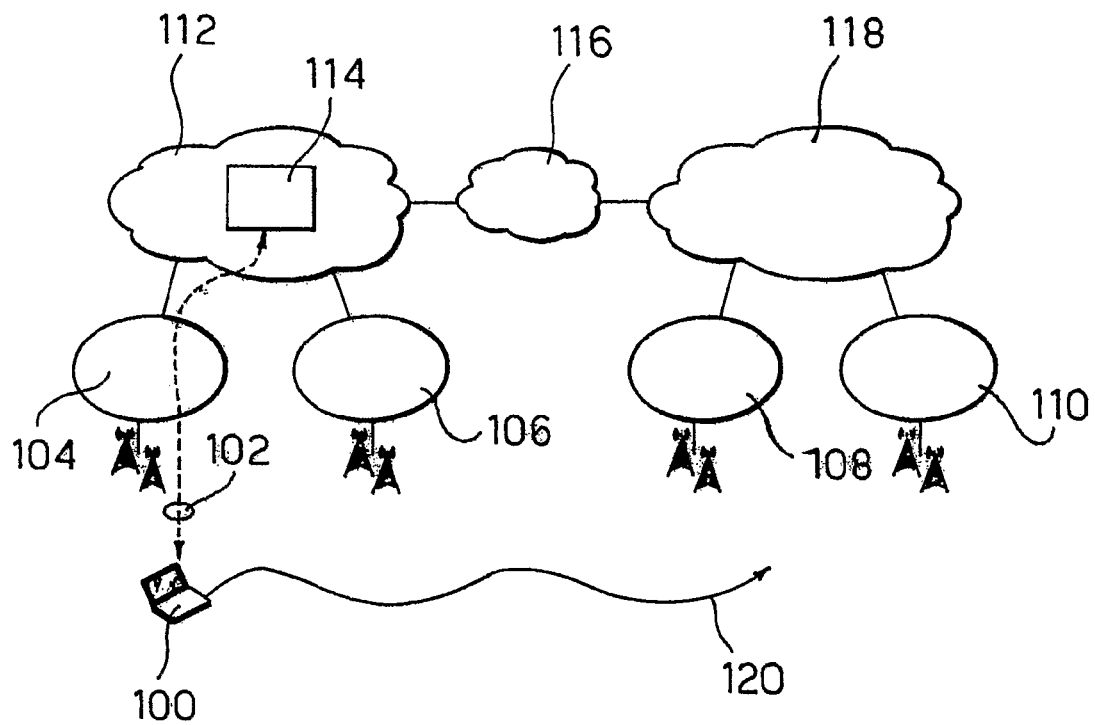
Fig_2
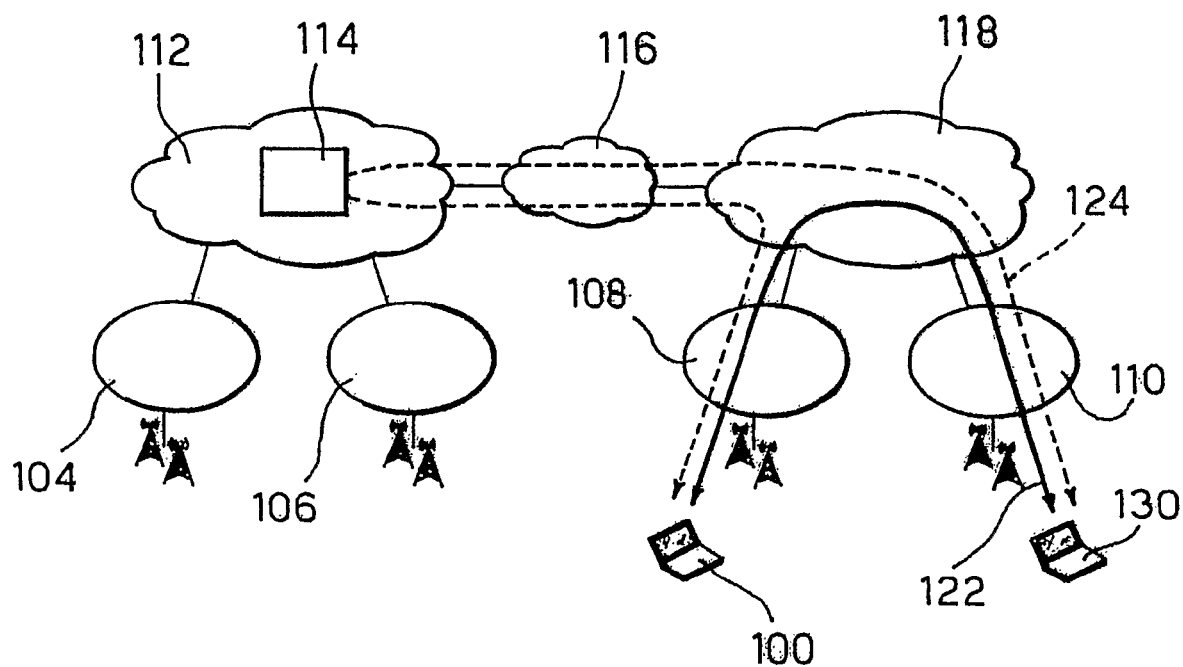

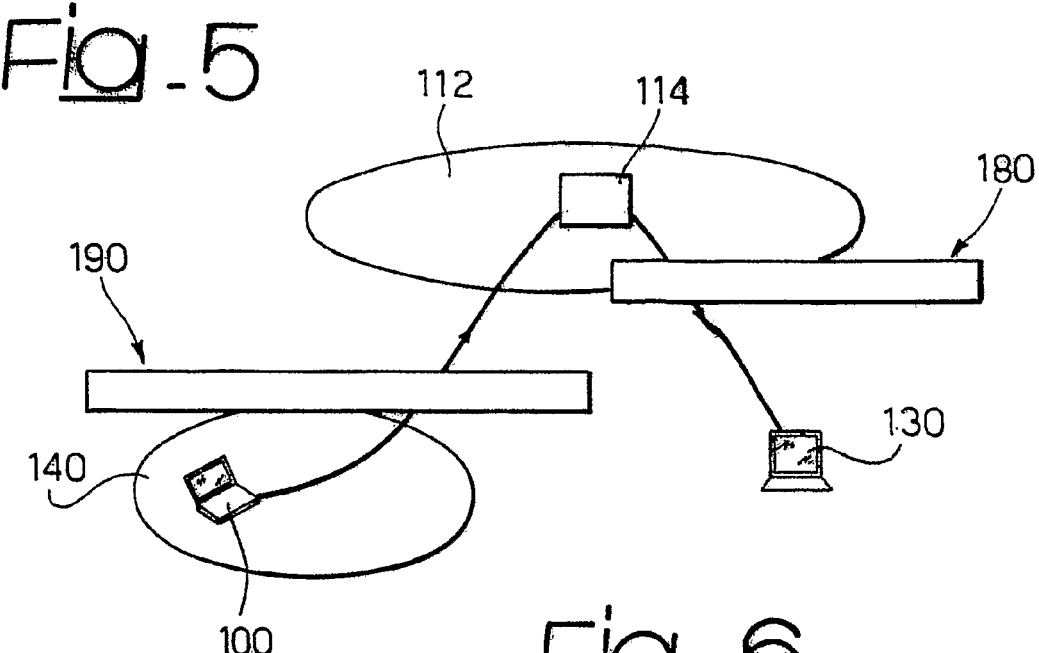
Fig_5
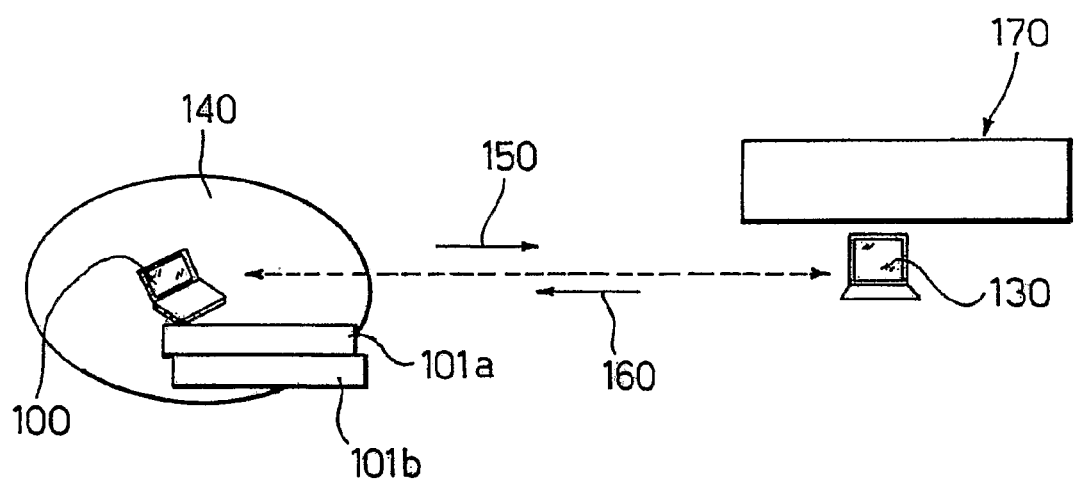
Fig_6
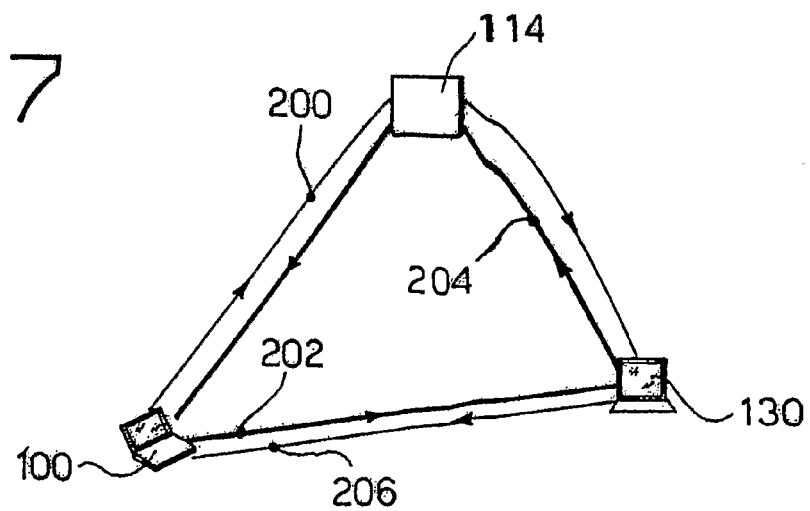
Fig_7

ROUTING METHOD, SYSTEM, CORRESPONDING NETWORK AND COMPUTER PROGRAM PRODUCT

CROSS REFERENCE TO RELATED APPLICATION

This application is a national phase application based on PCT/IB2004/001165, filed Apr. 19, 2004, the content of which is incorporated herein by reference.

FIELD OF THE INVENTION

The present invention concerns the traffic routing techniques within communications networks and has been developed in particular for the possible application to the so called IP-based mobile networks. The term "IP-based mobile networks" identifies the mobile networks adopting the IP protocol for data routing.

It should however be noted that reference to this particular field must not be regarded as limiting the application range of the present invention.

BACKGROUND OF THE INVENTION

IP-based mobile networks are characterized by a scenario in which a mobile user moves within the network and generates traffic that is routed inside the network towards the nodes with which he is communicating (correspondent nodes). During his movements, the user can connect with networks different from that of his service provider or operator. In that case there is also the possibility for the user of entering an unknown access network with which no agreement exists in terms of movement management or roaming.

In such a situation the need arises of making the user reachable at any instant and anywhere he may be, and of keeping active all the communication sessions that the user has in progress.

During his movements, the user may have to change the access network (sub-network) that enables him to use IP services. This operation must be transparent to the user so that he can continue communicating with the correspondent nodes without interruptions.

Due to their intrinsic nature, the conventional protocols used as the basis of IP networks were not capable of managing IP terminals moving within the network. To fill up this gap, the standardization group known as IETF (Internet for Engineering Task Force) has worked out the Mobile IP protocol, that allows a mobile terminal to change its point of attachment to the network in a transparent manner with respect to the applications. The Mobile IP protocol is available for both the IPv4-based networks as Mobile IPv4, and for IPv6-based networks as Mobile IPv6.

Mobile IPv6 is specified in the document draft-ietf-mobileip-ipv6-24. This is the first reference made in the present description to draft . . . or RFC . . . standards: any relating information will be laid open at the filing date of this application at the IETF web site under the address http://www.i-etf.org.

In case Mobile IPv6 is adopted, two IP addresses must be assigned to the mobile node: the first address is its Home Address (HoA), which never changes and is used to uniquely identify the identity of the node (in the sequel also referred as mobile node or terminal), while the second address is the Care-of Address (CoA), an address belonging to the visited subnet used to identify the actual position of the mobile terminal.

Any movement implying a change in the IP subnet being visited requires that the mobile terminal registers its own Care-of Address at a server, called Home Agent (HA), present on its provider's network (also called "home network"). Any other IP terminal trying to communicate with the mobile node by contacting it on the provider's network of the same mobile node (through the Home Address) is re-directed by the Home Agent HA towards the actual position of the mobile node, which is identified by the Care-of Address. In this way all the traffic directed to the mobile node is sent by the Home Agent to the current address of the user, i.e. the Care-of Address. Thus, the mobile node is constantly reachable, regardless of its connection point to the network.

FIG. 1 shows a generic scenario of Mobile IPv6 usage within the IP network hosting the mobile node.

In particular, in FIG. 1 the mobile node MN (Mobile Node) denoted by 100 is linked to the access network denoted by 104.

Network 104 allows mobile node 100 to establish a connection with the network 112 of its provider and in more detail it allows it to establish a communication session 102 with a particular server, called Home Agent (HA) and denoted by 114 in FIG. 1.

References 106, 108 and 110 indicate other possible networks (subnetworks) for accessing the IP network. Furthermore, reference 116 denotes an interconnection network between the network 112 of the provider of mobile node 100 and the network 118 of another provider. The movement of mobile node 100 within the network is indicated by the arrow 120.

Mobile IPv6 defines two communication modes between mobile node 100 and the nodes, called "correspondent nodes", with which node 100 is communicating. These two modes are illustrated in FIG. 2.

The first mode, referred to as Bi-directional Tunneling (BT), requires the movements of mobile node 100 to be known only to its Home Agent 114; therefore all the traffic relating to mobile node 100 is intercepted by Home Agent 114, which re-directs it to the correct destination, i.e. towards the Care-of Address of the mobile node.

In this way, all the traffic generated and received by mobile node 100 goes through the provider's network 112 of the same mobile node. In FIG. 2, the traffic path followed in this mode, called Bi-directional Tunneling, is depicted by a broken line and denoted by reference 124.

The second mode, referred to as Route Optimization (RO), implies instead that by any of its movements the mobile node 100 shall send information about its new position, i.e. the new Care-of Address, also to the correspondent nodes 130. In this way said nodes 130 can exchange traffic directly with mobile node 100, as they know its address within the network being visited (i.e. the Care-of Address).

Consequently, the traffic directed to mobile node 100 has no longer to go necessarily through the provider's network 112, but may follow the "optimized" path indicated by means of a continuous line in FIG. 2 and denoted by reference 122. All this is to take place by an at least partial exclusion of the provider's network 112.

The possibility of communicating through the second mode, i.e. Route Optimization, has been introduced into Mobile IPv6 because it allows the optimization of traffic routing. This normally results in an improvement in the performance experienced by the users, owing to a better management of the network resources, which prevents the overload of the provider's network relating to the mobile node by virtue of an at least partial exclusion of provider's network 112 from the routing path.

According to the Mobile IPv6 specifications, the choice of communicating in Bi-directional Tunneling mode or in Route Optimization mode is completely left to the mobile terminal, and the provider's network (i.e. the network denoted by 112 in FIGS. 1 and 2) does not have any means of intervention on such a choice.

This operational behavior perfectly fits into the case wherein the user moves within the network of his provider (e.g. a mobile operator or an Internet Service Provider (ISP)) or inside the networks of other providers with which roaming agreements are in place. In fact, in all these cases, regardless of the routing mode (i.e. Bi-directional Tunneling or Route Optimization), the provider with which the mobile user has subscribed to the service, with a possible co-operation of the provider managing the visited network, is always in a position to monitor and check the resulting traffic. All the above is devised to guarantee, whenever the connection point to the network varies, the uniformity of the service supplied and the possibility of charging accordingly.

However, in a wider mobility scenario, where movements are also possible towards local networks (e.g., company or corporate networks, free access public networks) with which no roaming agreements are in place, it may happen that in case of communication in the Route Optimization the service provider is no longer aware of the typology and quantity of the traffic generated by the user. This applies even if the exclusion of the supplier under question is not complete, but only partial: as a matter of fact, the supplier keeps allocating resources in order to ensure the user a set of value-added services, such as the guarantee of reachability at his own Home Address, and mobility management during movements.

Missing sufficient information for ensuring the uniformity of the service supplied, the provider may choose to interrupt the service at the Home Agent when the user is connecting to an access network with which no roaming agreements are in place (i.e. an unknown access network).

Obviously this situation is disadvantageous for the user who may not be actually provided with the mobility level on which he relies, since the service continuity can no longer be guaranteed.

OBJECTS AND SUMMARY OF THE INVENTION

From the previous description of the state of the art, the need becomes obvious of defining a technique which enables one to manage, in a fully satisfactory manner, situations in which a mobile user connects to local networks for which no roaming agreements exist with the provider with which the user has a service subscription.

The aim of the present invention is that of meeting such a requirement.

According with the present invention, said aim is attained through a method having the characteristics recalled in the subsequent claims. This invention also concerns a related system as well as an information technology product which can be loaded into the memory of at least one computer and comprises portions of a software code to implement the above method. So as is used here, the reference to such an information technology product is considered to be equivalent to the reference to a computer-readable means, containing instructions to control a computer system in order to co-ordinate the execution of the method according to the invention. The reference to "at least one computer" has the purpose of stressing the possibility for the present invention to be implemented in a distributed and/or modular way.

A form of embodiment of the invention preferred at present requires to check the traffic routing relating to a mobile node associated with a provider's network. The mobile node is capable of communicating with at least one correspondent node associated with an additional network. For the mobile node and the correspondent node the possibility is envisaged to communicate in at least a first operation mode (for instance, Bi-directional Tunneling) through the provider's network, and a second operation mode (for instance, Route Optimization) by an at least partial exclusion of the provider's network. With the provider's network there is associated at least one element, typically the Home Agent, which serves the mobile node and is configured to selectively check the authorization of the mobile node to act in the second operation mode by exclusion of the provider's network.

The solution described herein allows a provider to maintain the supervision over the traffic generated by its users without restricting their freedom of movement. In particular the need is eliminated of making resort, if necessary, to a disconnection of a user whenever such user connects to an unknown access network.

To attain this aim, a form of embodiment herein described envisages that the service provider may possibly intervene in order to selectively inhibit the use of the Route Optimization technique, thus forcing the user to keep on communicating in the Bi-directional Tunneling mode. All the above shall be performed in such a way that the traffic from and towards the mobile node goes through the network of the provider with which the user has taken out the service subscription (so-called "home network").

This way of operation may be used by the provider to supervise the user's activity in case said user has moved to an access network for which no roaming agreements exist. As a matter of fact, in this way all the traffic transmitted and received by the mobile node, is caused to go through a centralized server (i.e. the Home Agent), over which information on the use of the service (including any charging data) can be collected and/or dedicated policies can be enforced on particular application flows.

In the embodiment form preferred at present, the technical solution described herein envisages that, on the basis of policies worked out by the network manager, the Home Agent can intercept at least one of the signaling messages sent out by the mobile node to establish the communication in the Route Optimization mode, and intervene in the procedure, for instance to cause the communication to continue in Bi-directional Tunneling in case the mobile user has connected to an unknown network.

BRIEF DESCRIPTION OF THE DRAWINGS

The invention will now be described by way of a non limiting example with reference to the figures of the appended drawings, where:

FIGS. 1 and 2 have already been described previously;

FIG. 5 is a functional flow chart representative of the communication from a mobile node MN to a correspondent node according to the Bi-directional Tunneling mode, FIG. 6 is a diagram representative of the updating of a new position at a correspondent node, FIG. 7 is another diagram representative of the procedure called "Return Routability"

DETAILED DESCRIPTION OF EMBODIMENT EXAMPLES OF THE INVENTION

The Mobile IPv6 protocol (MIPv6) is the solution, proposed within IETF (Internet Engineering Task Force), for handling mobility of a terminal between IPv6 networks (ref. draft-ietf-mobileip-ipv6-24).

The protocol under question allows a mobile node (already denoted by 100 in FIGS. 1 and 2) to access a network from different positions maintaining a single identity, and to dynamically change the point of attachment keeping active the existing connections.

As has already been said, the protocol manages the mobility of the mobile node (MN) by introducing:
two different IPv6 addresses for each mobile node, namely the Home Address and the Care-of Address, and
a new agent, called Home Agent (HA).
Of the two different addresses:
i) the first one, i.e. the Home Address (HoA), is an address assigned by the provider with which the user has taken out a service subscription; this address never changes (at least for the duration of the work session) and is used to uniquely identify the mobile node identity;
ii) the second one, i.e. the Care-of Address (CoA), is an address belonging to the visited network, dynamically obtained by the mobile node through an IPv6 auto-configuration. This address identifies the current position of the mobile node and varies therefore by each movement of the same mobile node.

The new agent, i.e. the Home Agent (HA), is located on the network of the provider with which the user has a service subscription (so-called "home network") and has the task of re-directing the traffic destined to mobile node 100 (i.e. the traffic addressed to the Home Address) to the current position of the same mobile node (i.e. the Care-of Address or CoA).

Figure 3:
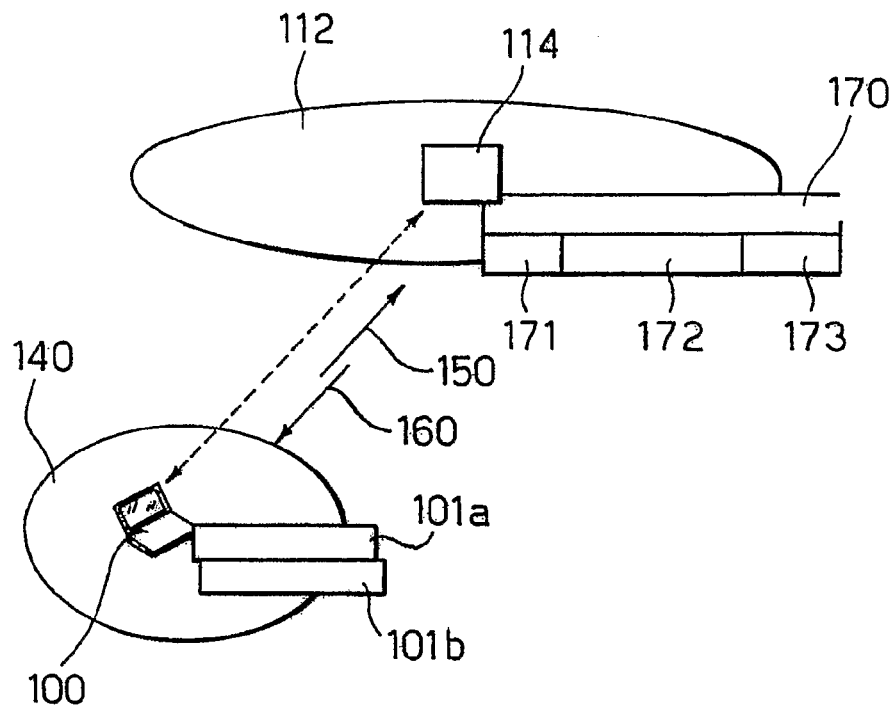
FIG. 3 is a functional flow chart, representative of the registration procedure of the Mobile IP protocol, such as Mobile IPv6.

With reference to FIG. 3, when mobile node 100 moves and changes its point of attachment, it obtains through the IPv6 auto-configuration (for instance, stateless auto-configuration—ref. rfc2462) the new CoA, denoted by 101$b$, corresponding to its current position within the visited network 140.

At this point, mobile node 100 informs its Home Agent 114 about such an address (i.e. CoA) through a signaling message 150, called Binding Update.

Home Agent 114 updates the table denoted by 170, called Binding Cache, storing the new position of mobile node 100 and replies to the same mobile node 100 through a message 160 of Binding Acknowledgement, confirming the successful outcome of the registration.

In the Binding Cache table, beside the identifier of the mobile node, stored in a field 171, there are—in a field 172—addresses HoA and CoA. Finally, in field 173 of this table the information is given concerning the validity duration of the previous fields.

Figure 4:
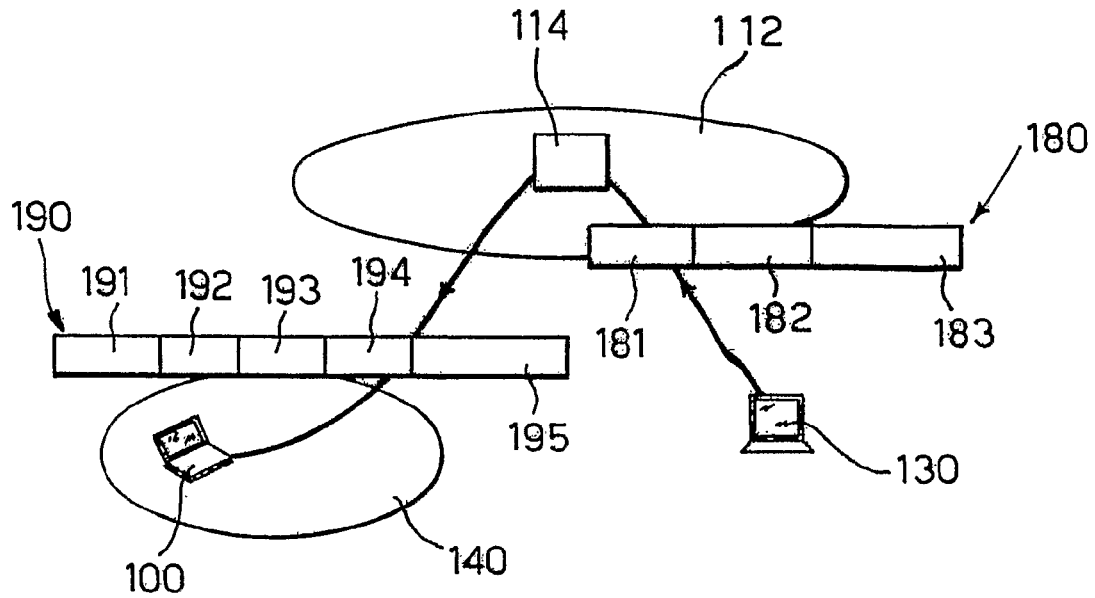
FIG. 4 is a functional flow chart representative of the communication from a correspondent node to a mobile node according to the Bi-directional Tunneling mode.

Referring to FIGS. 4 and 5, it will be noted that, once mobile node 100 has registered, Home Agent 114 intercepts all the traffic destined to it and redirects it through tunneling in "IPv6 in IPv6" mode to the current position of the mobile node (i.e. CoA).

In this manner, the correspondent nodes (CN, Correspondent Node), denoted by 130, must not necessarily be aware of the movement of mobile node 100: all that occurs as if mobile node 100 was still on Home Network 112. Likewise, mobile node 100 transmits the packets to the correspondent nodes 130 encapsulating them into packets destined to Home Agent 114, so that they can reach the correspondent nodes 130 from the home Network 112 (and therefore having the Home Address as a source address).

In the detail of FIGS. 4 and 5, reference 180 indicates a generic IP packet sent by the correspondent node 130 to the Home Agent 114. Such a packet has the address of the correspondent node 130 as a source address (field 181) and the Home Address HoA of mobile node 100 as a destination address (field 182). Further, a payload is present as field reference 183.

Reference 190 indicates the packet resulting from the encapsulating action performed by the Home Agent 114. In particular, references 193, 194 and 195 indicate three fields corresponding to the fields 181, 182 and 183 of packet 180; in packet 190, these three fields are preceded by the two fields 191 and 192, which represent the source and destination addresses of the encapsulated packet and contain, respectively, the address of the Home Agent 114 and Care-of Address CoA of mobile node 100.

The structure of packets 180 and 190 depicted in FIG. 4, is maintained in case of the homologous packets of FIG. 5, except that, in case of the packets of FIG. 5, the order of the fields is modified to take account of the different direction of the traffic involved.

As will be noted from the figures just described, the correspondent nodes 130 are not the destination of any of the Mobile IPv6 signaling messages and therefore they can continue to communicate with mobile node 100 even if they do not support said protocol.

The traffic routing that is obtained through the Bi-directional Tunneling mode is not optimized: in fact, all the packets transmitted by mobile node 100 or addressed to it, must go through Home Agent 114 and therefore they must travel on home network 112 (i.e. the network of the provider with which the user has a service subscription).

This is the reason why a second communication method, called Route Optimization, is provided between mobile node 100 and the correspondent node 130.

According to said communication mode, depicted in FIG. 6, mobile node 100 notifies its position (i.e. the CoA denoted by 101$b$) also to the correspondent node 130 by means of a message 150, called Binding Update. From that very moment, mobile node 100 and correspondent node 130 can communicate directly, thus preventing that their traffic goes through Home Agent 114.

In FIG. 6 there is depicted the procedure for updating at the correspondent node 130 the information concerning the position of mobile node 100. To operate in the Route Optimization mode, the correspondent node must support Mobile IPv6, i.e. it must be provided with a table 170, called Binding Cache, to store and update the actual position of mobile node 100.

All the Mobile IPv6 signaling messages are authenticated to prevent security attacks based on false registrations. Whilst mobile node 100 and Home Agent 114 may be assumed to share a security association and therefore can use the IPsec protocol for this purpose, correspondent node 130 and mobile node 100 can not be assumed to share a pre-configured secret, since the correspondent node can be any node in the Internet.

For this reason Mobile IPv6 introduces a signaling procedure, called Return Routability, that allows these nodes to exchange a key and make signaling secure, even though they do not share a secret.

The Return Routability procedure is depicted in the diagram of FIG. 7:

mobile node 100 sends two messages, referred to as Home Test Init (HoTI), denoted by 200, and as Care-of Test Init (CoTI), denoted by 202. The first message is forwarded in Bi-directional Tunneling mode (i.e. through Home Agent 114) and the second one is sent directly to the correspondent node 130, with the Care-of-Address 101b as a source address. Along the network path between mobile node 100 and Home Agent 114, message 200 HoTI is protected by IPsec (ref. draft-ietf-mobileip-mipv6-ha-ipsec-04);

upon receiving the two messages 200 and 202, the correspondent node 130 generates some random data and sends them to mobile node 100 along with two additional messages, Home Test (HoT), denoted by 204, and Care-of Test (CoT), denoted by 206. The first message 204 is addressed to the HoA 101a and the second one to the CoA 101b of mobile node 100. Along the network path between Home Agent 114 and mobile node 100, message 204 HoT is protected by IPsec;

at this point, mobile node 100 and correspondent node 130 make use of the random data generated by correspondent node 130 to generate a shared secret, and use this value to sign all the signaling messages they exchange (Binding Update message 150 and Binding Acknowledgement message 160).

Thus Mobile IPv6 leaves to mobile node 100 the choice of communicating in Bi-directional Tunneling mode or in Route Optimization mode; the policies by which these choices are made are not analyzed within the standard.

Assuming a mobility scenario with possible movements towards local networks with which no roaming agreements are in place, the choice of communicating in Route Optimization mode may prevent the service provider from exerting a supervision on the user's traffic (both typology and amount) and on the resources allocated to it. This fact may be unacceptable, since the user, though being linked to a third party's network, continues to take advantage of a number of value-added services offered by his own origin provider through the Home Agent (namely, guarantee of reachability at his own Home Address and mobility management during his movements).

In such cases, therefore, the provider could simply decide to interrupt the service at the Home Agent whenever the user connects to an access network towards which no roaming agreements are in place (i.e. the case of an unknown access network).

A typical example for the occurrence of this situation is the case of a user on the move that, after starting a work session inside his own provider's network (for instance GPRS), moves to a local network (for instance, a Wireless LAN) which is managed, as a free access or a pay per use network, by a community or by a private citizen.

In such a case the mobile user 100 continues to benefit of the Home Address and reachability service supplied by the Home Agent, even if he is attached to a public network and therefore does not exploit the network access (for instance GPRS) supplied by his own provider.

The solution described herein introduces a mechanism that allows the provider to keep the supervision on the traffic generated by its users, without restricting their freedom of movement. In particular it is eliminated the need of making resort to a forced disconnection of the user when said user moves inside an unknown access network.

For this purpose, the solution described here envisages that the service provider can selectively inhibit the use of the Route Optimization technique, forcing the user to communicate in Bi-directional Tunneling mode, in order that all the traffic to and from the mobile node must go through his own home network.

In particular, the solution described herein allows the provider's network to notify the mobile node whether it is authorized to communicate in Route Optimization mode or not. Furthermore, the provider's network can decide to inhibit the use of the Route Optimization mode by a mobile node that is not authorized: in this way, the choice of the communication mode is subject to the provider's supervision.

The objects forming the architecture, and taking part in the implementation of the functions envisaged by the solution described herein, are substantially the following:

Home Agent 114, where a module is located which, on the basis of the policies defined by the manager, can selectively intercept some of the signaling messages exchanged during the Return Routability procedure, and can therefore affect the possibility for mobile node 100 of communicating in the Route Optimization mode. By using an extension in the Binding Acknowledgement (BA) messages, this module has also the task of notifying mobile node 100 whether it has been authorized to communicate in Route Optimization mode from his current position or a different policy has been applied thereto;

mobile node 100, where a respective module is located which is capable of interpreting the notifications sent by the Home Agent 114 inside the Binding Acknowledgement messages. The presence of this module on the mobile node 100 is optional: the solution suggested herein can in fact work correctly (though requiring more bandwidth) provided that, if mobile node 100 cannot be informed of the fact that communication in Route Optimization mode is not allowed from its current position, the same mobile node 100 shall continue repeating the Return Routability procedure, at regular intervals, assuming that the failure in the procedure completion has been caused by an ordinary loss of signaling packets.

Figure 8:
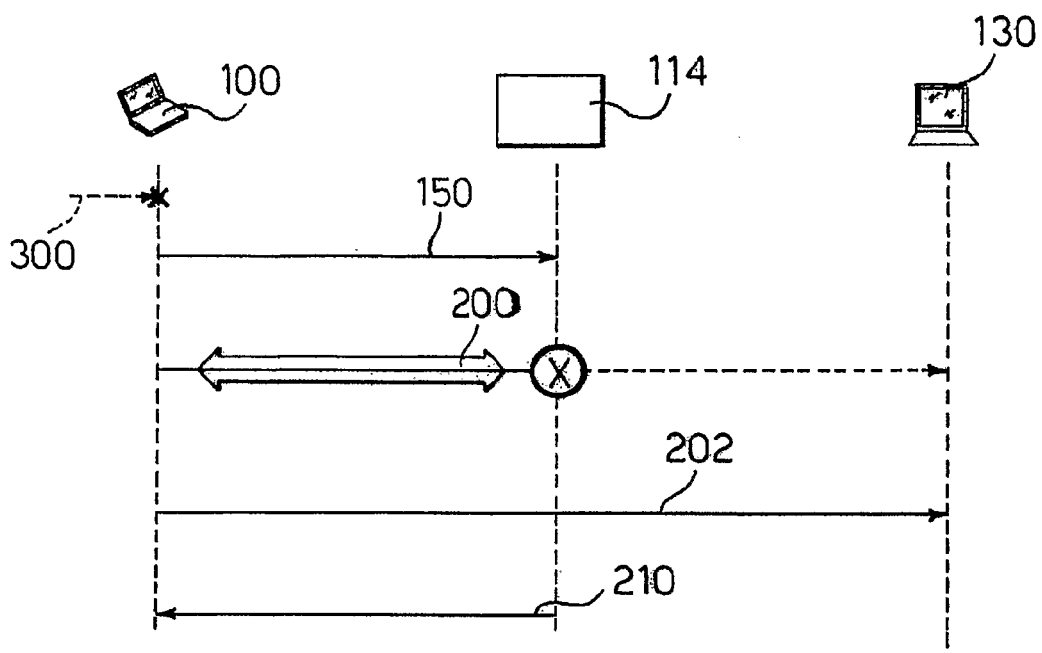
FIG. 8 is a diagram illustrating in detail a method for checking the possibility of communicating in Route Optimization mode by a mobile node.

In this regard, an example of procedure applicable to the solution described here is depicted in FIG. 8. In particular, it will be assumed that a movement of mobile node 100 (represented by a cross, 300) causes mobile node 100 to leave its "home network" 112, and enter a network for which no roaming relationships exist with the operator which acts as a provider for network 112.

At first, so as provided by Mobile IPv6, mobile node 100 sends a message 150 of Binding Update to its own Home Agent 114 indicating its new current position (namely the new CoA).

Mobile node 100 can then start the Return Routability procedure in order to communicate in the Route Optimization mode with one of its correspondent nodes 130.

For this purpose, mobile node 100 sends two messages simultaneously:

a message 200 of Home Test Init is sent to the correspondent node 130 in Bi-directional Tunneling mode: message 200 is therefore encapsulated into a second message addressed to Home Agent 114. This implies that, before reaching correspondent node 130, said message 200 reaches Home Agent 114;

a message 202 of Care of Test Init is sent directly to the correspondent node 130, without going through the home network 112.

Upon receiving the Binding Update message 150, Home Agent 114 registers in its Binding Cache 170 the new position of mobile node 100 and verifies (on the basis of the policies defined by the network administrator) whether mobile node 100 is authorized to communicate in Route Optimization mode from its current position.

This check can be performed in different ways.

For instance, Home Agent 114 can keep a table containing the list of network prefixes from which communications in Route Optimization mode are allowed (or expressly forbidden). This table may be specific for each user (for instance, according to the service profile, some users could also be authorized to use the Route Optimization mode from every network).

As an alternative, Home Agent 114 may analyze the information present at the authentication server and verify whether or not the user is accessing from a known network (i.e. from a network with which there is a roaming agreement).

In the former case the decision of authorizing or not the Route Optimization procedure can be made on the basis of the user's service profile and taking account of the identity of the network/operator from which the user is accessing.

In the latter case, instead, the operator can decide whether to authorize communications in the Route Optimization mode unconditionally or to evaluate them case by case considering the user's service profile.

Figure 9:
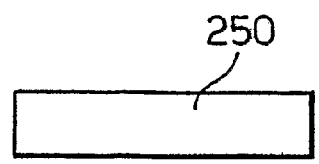
FIG. 9 shows a possible message format that may be used in the solution herein described.

When the mobile node is authorized to communicate in Route Optimization from his current position, the procedure ends with the transmission of a Binding Acknowledgment message 210 to the mobile node. The format of said message is different from the format envisaged by Mobile IPv6, as there is an additional bit, denoted by 250 in FIG. 9, which is used to inform the mobile node that Route Optimization communications are allowed.

If the additional bit 250 is set to one, the Route Optimization mode is allowed; if it is set to zero, Route Optimization mode is not allowed.

In case the mobile node is not authorized to communicate in the Route Optimization mode, Home Agent performs two operations, namely:

it sends the mobile node a Binding Acknowledgement message, notifying that Route Optimization is not allowed inside the network being visited;

it applies filtering policies to the Home Test Init (HoTI) messages sent by mobile node 100, in order to inhibit their forwarding towards the correspondent nodes. In this way it prevents the completion of the Return Routability procedure, thereby forcing the mobile node to continue communicating in Bi-directional Tunneling mode.

The procedure described in FIG. 8 may be repeated with time at given intervals and therefore, if necessary, Home Agent 114 can make the session continuation in Route Optimization conditional upon defined rates/charging plans.

Figure 10:
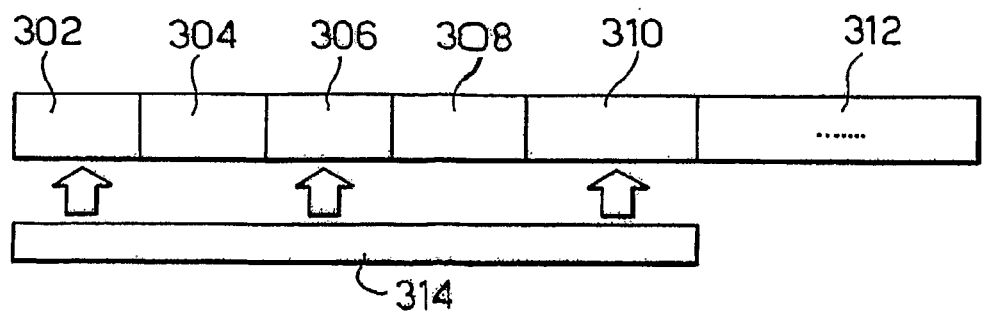
FIG. 10 shows the fields inspected by the Home Agent inside the signaling packets transmitted by the mobile node in order to start the communication in Route Optimization.

FIG. 10 shows the format of the Home Test Init (HoTI) message sent by mobile node 100 to Home Agent 114 in Bi-directional Tunneling mode.

The fields denoted by 302 and 304 represent, respectively, the source and destination addresses of the IP packet where the HoTI message is encapsulated to force its passing through the Home Agent.

Field 302 contains the Care-of Address of mobile node, whilst field 304 contains the Home Agent address.

The subsequent fields, denoted by 306 and 308, represent, respectively, the source and destination addresses of the HoTI message as such. Field 306 contains the Home Address of mobile node 100, whereas field 308 contains the address of correspondent node 130.

Fields 310 and 312 represent the information contents of the message, encoded in the form of Mobility Header, so as defined by the Mobile IPv6 standard. In particular, field 310 contains an indication of the type of message being exchanged, i.e. the Mobility Header Type. From the contents of field 310 one may understand if the message under question is a HoTI message or a different signaling message envisaged by the Mobile IPv6 standard.

Eventually reference 314 indicates the filter present at the Home Agent HA to selectively block HoTI messages generated by mobile node 100, when such a node is not authorized to communicate in the Route Optimization mode from its current position. Filter 314 is active on fields 302, 306 and 310.

It may be noted that filter 314 inspects both the outer header 302 of the packet and the inner header 306, including the Mobility Header Type 310 (from which it can be understood if the packet is actually a HoTI message).

Once the mobile node has received a Binding Acknowledgement message informing that communication in Route Optimization mode is forbidden, it should discontinue sending HoTI and CoTI messages.

Such a behavior is optional and does not affect the effectiveness of this procedure, in that the HoTI message is in any case blocked by Home Agent 114 before reaching the correspondent node 130. Anyway, doing so, mobile node 100 would avoid sending useless signaling traffic over the network, thus optimizing its own bandwidth and processing resources.

The procedure previously described for controlling Route Optimization has been set out in detail considering a particular scenario characterized by the use of:

Mobile IPv6 protocol for managing the movements of the mobile node;

the Return Routability procedure for managing the change over from Bi-directional Tunneling to Route Optimization.

However, the mechanism on which the invention is based can be extended to situations wherein:

the change over from Bi-directional Tunneling to Route Optimization is managed through procedures different from the Return Routability, based on the exchange of one or more signaling messages routed through the Home Agent;

the movements of the mobile node are managed by using different protocols (for instance, Mobile IPv4 protocol, rif. rfc3344), wherein the change over from Bi-directional Tunneling to Route Optimization is accomplished through the use of signaling procedures having identical or similar characteristics, and therefore being equivalent, to the procedures described at the previous point (Return Routability).

As a consequence, leaving unchanged the principle of the invention, the embodiment particulars and the form of the embodiments may change, also in a significant manner, with regard to what has been described and illustrated by way of a non limiting example, without departing from the scope of the invention, so as defined by the following appended claims.

The invention claimed is:

1. A method for controlling the routing of traffic relating to a mobile node associated with a network of a provider, said mobile node being capable of communicating with at least one correspondent node associated with an additional network, comprising:
- providing, for said mobile node and said correspondent node, the possibility of communicating in at least one first operation mode in which said mobile node and said correspondent node communicate through an agent of said mobile node, and in a second operation mode in which said mobile node and said correspondent node exchange traffic directly; and
- associating with said provider's network at least one element, other than said mobile node, configured to selectively check the authorization of said mobile node to act in said second operation mode.

2. The method of claim 1, comprising configuring a server of said provider's network that serves said mobile node as said at least one element.

3. The method according to claim 1, comprising selectively inhibiting through said at least one element, the use of said second operation mode by said mobile node, forcing said mobile node to use said first operation mode to communicate with said correspondent node.

4. The method according to claim 1, comprising:
- intercepting through said at least one element at least one signaling message generated by said mobile node and sent in order to set said second operation mode; and
- selectively intervening, by said at least one element, on the changeover between said first operation mode and said second operation mode as a function of said intercepted message.

5. The method according to claim 4, comprising using a message of home test init type as the at least one signaling message generated by said mobile node and sent in order to set said second operation mode.

6. The method according to claim 1, comprising:
- selectively checking at given intervals, through said at least one element, the authorization of said mobile node to operate in said second operation mode; and
- conditioning the continuation of operation of said mobile node in said second operation mode upon defined rates or charging plans.

7. The method of claim 1, comprising:
- receiving through said at least one element at least one message sent by said mobile node and indicative of the possible activation of said second operation mode;
- registering at said at least one element the current location of said mobile node; and
- verifying through said at least one element, and based on the received at least one message, whether the mobile node is authorized to communicate in said second operation mode from the registered current location.

8. The method of claim 1, comprising sending to said mobile node an acknowledgement message containing a symbol indicative of the fact that the communication in said second operation mode is allowed or not allowed.

9. The method of claim 1, comprising, in the event that said mobile node is not authorized to communicate in said second operation mode, at least one of:
- sending to the mobile node a message indicating that said second operation mode is not allowed on said additional network; and
- applying filtering policies to messages sent out by said mobile node toward said correspondent node.

10. The method of claim 1, wherein said network is a network in which the mobility of the terminals is managed through a mobile IP type protocol.

11. The method of claim 1, wherein said first operation mode is an operation mode of bi-directional tunneling type.

12. The method of claim 1, wherein said second operation mode is an operation mode of route optimization type.

13. A computer program product loadable in the memory of at least one electronic computer and comprising portions of software code capable of performing the method according to claim 1.

14. A system for controlling the routing of the traffic relating to a mobile node associated with a provider's network, said mobile node being capable of communicating with at least one correspondent node associated with an additional network, wherein for said mobile node and said correspondent node, there is the possibility of communicating in at least a first operation mode in which said mobile node and said correspondent node communicate through an agent of said mobile node, and a second operation mode in which said mobile node and said correspondent node exchange traffic directly, said system comprising at least one element, other than said mobile node, associated with said provider's network and configured for selectively checking the authorization of said mobile node to operate in said second operation mode.

15. The system of claim 14, wherein said at least one element associated with said provider's network is a server of said provider's network serving said mobile node.

16. The system of claim 14, wherein said at least one element associated with the provider's network is configured to selectively inhibit through said at least one element, the use of said second operation mode by said mobile node, forcing said mobile node to use said first operation mode to communicate with said correspondent node.

17. The system of claim 14, wherein the system is configured to:
- intercept through said at least one element at least one signaling message generated by said mobile node and sent in order to set a second operation mode; and
- intervene selectively, by said at least one element, on the changeover between said first operation mode and said second operation mode as a function of said intercepted message.

18. The system of claim 17, wherein said system is configured to use a message of the home test init type as the at least one signaling message generated by said mobile node and sent in order to set the second operation mode.

19. The system of claim 14, wherein at least one element associated with the provider's network is configured to:
- selectively check at determined intervals, through aid at least one element, the authorization of said mobile node to operate in said second operation mode; and
- make the continuation of operation of said mobile node in said second operation conditional upon defined rates or charging plans.

20. The system of claim 14, wherein said at least one element is configured to:
- receive from said mobile node at least one message indicative of the possible activation of the second operation;
- register the current location of mobile node; and
- check whether said mobile node is authorized to communicate in said second operation mode, based on said received at least one message and said current location.

21. The system according to claim 14, wherein said at least one element is configured to send to said mobile node an acknowledgment message containing a symbol indicative of the fact that communication in said second operation mode is allowed or not allowed.

22. The system according claim 14, wherein said at least one element is configured to accomplish, in case said mobile node is not authorized to communicate in said second operation mode, at least one of:

sending to the mobile node a message indicating that said second operation mode is not allowed in said additional network; and applying filtering policies to messages sent by said mobile node toward said correspondent node.

23. A communications network comprising a system according to claim 14.

24. The communications network of claim 23, wherein said network is a network of mobile IP type.

25. The network of claim 23, wherein said first operation mode is an operation mode of bi-directional tunneling type.

26. The network of claim 23, wherein said second operation mode is an operation mode of route optimization type.

\* \* \* \* \*

UNITED STATES PATENT AND TRADEMARK OFFICE
CERTIFICATE OF CORRECTION

PATENT NO.        : 7,808,986 B2                                     Page 1 of 1
APPLICATION NO.   : 11/578069
DATED             : October 5, 2010
INVENTOR(S)       : Giaretta et al.

It is certified that error appears in the above-identified patent and that said Letters Patent is hereby corrected as shown below:

* Claim 19, column 12, line 48, "through aid at" should read --through said at--.

Claim 22, column 13, line 1, "according claim 14," should read --according to claim 14,--.

Signed and Sealed this
Fourteenth Day of June, 2011

David J. Kappos
*Director of the United States Patent and Trademark Office*